Nov. 2, 1965   A. C. WRIGHT   3,215,383
SELF-LEVELING SUPPORT
Filed June 22, 1962
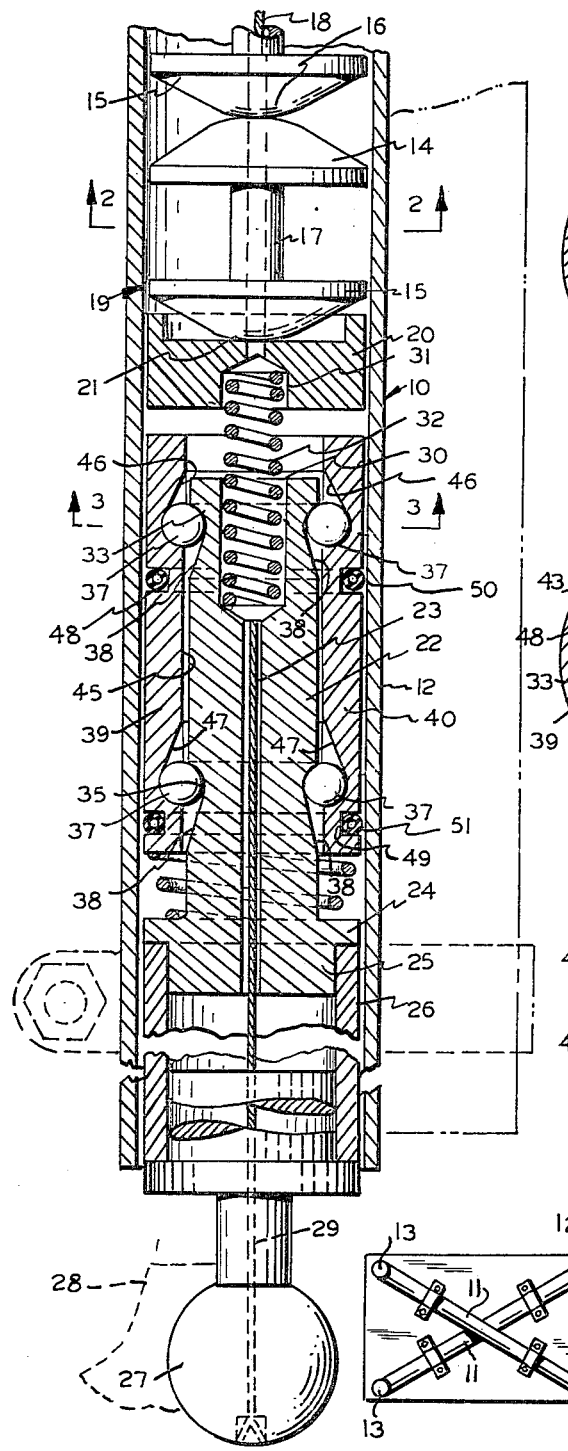
FIG. 1
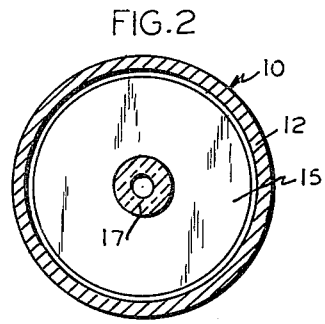
FIG. 2
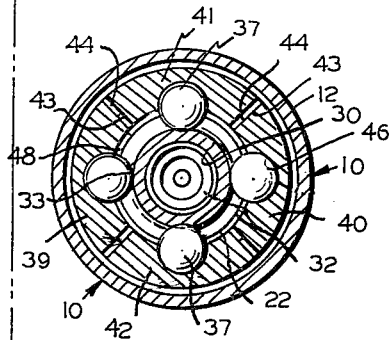
FIG. 3
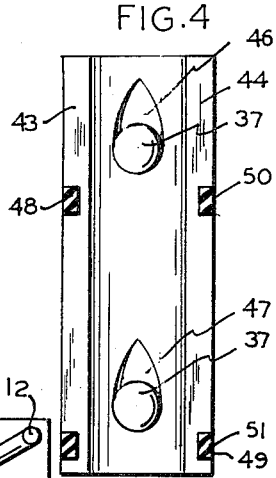
FIG. 4
FIG. 5
*INVENTOR.*
ALLEN C WRIGHT
BY
Phillip A. Friedell
ATTORNEY

United States Patent Office 3,215,383
Patented Nov. 2, 1965

3,215,383
SELF-LEVELING SUPPORT
Allen C. Wright, Oakland, Calif., assignor to Industrial Ladder Company, Inc., Oakland, Calif., a corporation of California
Filed June 22, 1962, Ser. No. 204,581
8 Claims. (Cl. 248—188.3)

This invention relates to improvements in clutches, specifically radially acting, axially operative clutches, for use in connection with ladder slope compensating devices, table or bench leveling and inclining apparatus, and similar purposes, while also providing an extremely compact clutch for power transfer.

When used as a power transmission clutch, one clutch element is fixed while the other is axially movable to provide the necessary thrust, while when used for leveling or slope compensating, both clutch elements are axially movable and operate through opposed axial thrusts.

The objects and advantages of the invention are as follows:

First, to provide a dependable clutch for installation in conventional slope compensating devices for ladders.

Second, to provide a clutch as outlined which will be automatically released when the opposed axial thrusts are imbalanced, for axial movement of the clutch in the direction of the lesser of the thrusts.

Third, to provide a clutch as outlined which can be applied, in connection with the conventional inverted U-shaped tubular housings and internal interconnecting thrust elements, to tables or benches, to form automatically adjustable legs, for leveling or inclining, at will.

Fourth, to provide a clutch as outlined which can be used as a power transmission clutch.

In describing the invention, reference will be had to the accompanying drawings, in which:

FIG. 1 is a sectional elevation through the invention with the tubular housing fragmentarily shown.

FIG. 2 is a section taken on line 2—2 of FIG. 1.

FIG. 3 is a section taken on line 3—3 of FIG. 1.

FIG. 4 is an inside elevational view of one of the clutch jaws.

FIG. 5 is a diagrammatic view showing the application of the table or bench leveling arrangement incorporating the invention.

The invention includes a tubular housing 10, which for ladders, tables, benches, and the like, is formed to inverted U-shape, and having flexible thrust means extending throughout the cross connection 11, and extending downwardly into the legs 12 and 13 and being freely movable therein.

A highly efficient thrust transfer means is disclosed in FIGS. 1 and 2, and in which the individual bead-like members each have a head at each end as indicated at 14 and 15, the central portion 16 of each head being spheroidally formed, and the heads of each bead-like member being joined by a thrust column 17 in which a passage is provided for the interconnecting stringing member, such as a cable 18. These bead-like members continue throughout the U-shaped housing from one clutch assembly to the other, with the terminal beads 19 cooperative with the head element of the clutch 20 which is a combination thrust member and spring seat, as indicated at 21, the combination thrust member and spring seat and all of the bead-like members being freely slidable in the housing.

The clutch actuator is cylindrical in form and has an axial passage 23 extending axially therethrough for the interconnecting stringing member 18, and is provided with an annular collar 24 which is freely slidable in the housing leg 12, and a pilot 25 projects downwardly from the collar and fits in the tubular foot sleeve 26, in the other end of which a suitable connection, such as the ball 27 is provided for the foot 28, an axial passage 29 also being provided for connection of the stringing member.

A bore 30 is formed axially in the upper end of the actuator, in registry with a bore 31 formed upwardly in the spring seat 20, and a compression spring 32 is seated and retained within these bores.

An annular recess is formed at each, the upper and lower ends of the actuator 22 as indicated at 33 and 35, with one end of the recess having a depth substantially equal to one half the diameter of the thrust ball 37 and therefrom being divergently formed to provide a wedge action for the balls, as indicated at 38.

Two or more clutch jaws may be used, four being shown at 39, 40, 41 and 42, the assembly thereof, with their sides 43 and 44 in contact, providing an axial bore 45 which is freely slidable on the actuator.

Wedge recesses 46 and 47 are formed in the inner periphery of each clutch jaw, said recesses being identical but arranged in opposed relation to the annular recesses 33 and 35, respectively, of the actuator, being upwardly convergent.

Retractive means is provided for the jaws, and includes annular grooves 48 and 49 formed in the periphery of the jaws, and in which elastic rings are seated as indicated at 50 and 51, and may consist of rubber O-rings, plain elastic bands, or tension springs, since their sole function is to contract the jaws.

The wedge recesses are preferably not formed to an angle in excess of fifteen degrees, and preferably ten to twelve degrees relative to the axis of the actuator.

The principal function of spring 32 is to urge the actuator to rlease the clutch jaws when the load is eased on both, or either of the legs, for automatic adjustment to compensate for variations in the planes for the leg supporting surfaces.

As the load is applied through the foot with coincident counterthrust through the members 14, the spring 32 is compressed, and the spring seat or reaction element 20 engages the tops of the jaws, forcing the jaws downward on the actuator, wedging the balls to expand the jaws to frictionally engage the inner periphery of the housing, thereby locking the leg in the instant position.

When the load on either leg is released, the spring 32 urges the actuator downwardly until the balls are located in the areas of maximum recess depths, which permits the jaws to be contracted through the medium of the elastic rings 50 and 51.

Thus, when the reaction is slightly in excess of the load, the clutch will lock, and when a predetermined differential occurs between the thrust and counterthrust, the clutch will move freely to the position where the thrust and counterthrust are practially equalized, where the clutch will lock to the housing leg.

I claim:
1. A clutch, in combination,
   a tublar housing,
   longitudinally segmented clutch jaws normally freely slidable in said housing,
   a cylindrical actuating member slidably located within said segmented clutch jaws, opposed tapered recesses formed respectively in the jaws and actuating member,
   a ball operative in each of the registered opposed recesses through interposition and opposed movement between the tapers of the opposed tapered recesses for expanding the jaws into contact with the interior of the housing,
   when thrust is applied to the actuating member axially in one direction, and to the jaws axially in the other direction, and
   spring means normally maintaining axial thrust on the actuating member in the one direction for freeing the jaws from contact with the interior of the housing when the thrust is relinquished from either of said directions.

2. A structure as defined in claim 1, in which
said spring means includes a combined spring seat and reaction member slidable in said housing and cooperative with the upper ends of the clutch jaws when opposed loads are applied to the respective opposite ends of the jaws and actuator for frictionally engaging the jaws with the interior walls of the housing, and
a spring cooperative between the spring seat and the actuating member for urging the actuating member to release the jaws from the interior walls of said housing, and
thrust means cooperative with said combined spring seat and reaction member.

3. A clutch comprising
a tubular housing,
an actuating member axially movable in said housing,
longitudinally segmented clutch jaws normally slidable within said housing and between its interior periphery and the actuating member,
opposed tapered recesses formed respectively in the inner walls of the jaws and the adjacent outer walls of the actuating member,
a thrust ball disposed within the confines of each pair of recesses, and operating means for moving said actuating member axially relative to said segmented clutch jaws for expanding the jaws into engagement with the inner periphery of the tubular housing when opposed axial thrusts on the jaws and actuating member are substantially equalized.

4. A structure as defined in claim 3, wherein said operating means comprises
a thrust member slidable in said housing and
means normally maintaining said thrust member out of contact with said jaws,
said thrust member being brought into contact with said jaws for imparting relative movement between said jaws and said actuating member when a predetermined axial load differential is applied to said thrust member and actuating member, said jaws being expanded when the counter thrust applied to the actuating member is substantially equal to the load applied to said thrust member.

5. A self-levelling support comprising: a frame; a pair of substantially parallel tubular housings mounted to said frame; a continuous support extending through both tubular housings and slidable relative to each; and clutch means within each housing responsive to a predetermined load applied to the support within respective housings for clutching said support to said housings.

6. A self-levelling support comprising: a frame; a pair of substantially parallel tubular housings mounted to said frame; a continuous support extending through both tubular housings and slidable relative to each; and clutch means within each housing responsive to a predetermined load applied to the support within respective housings for clutching said support to said housings; each of said clutch means forming a portion of said continuous support and comprising longitudinally segmented clutch jaws normally slidable in one of said tubular housings, a cylindrical actuating member slidably disposed within said segmented clutch jaws, said jaws and actuating member having opposed and registrable tapered recesses formed in adjacent surfaces, a ball disposed in each pair of opposed recesses and movable between the tapers of said recesses for expanding the jaws into contact with the interior of the tubular housing, and spring means for normally maintaining an axial thrust against said actuating member to free the jaws from contact with the interior of said tubular housing.

7. The self-levelling support of claim 6 wherein said continuous support includes a combined spring seat and reaction member slidable within said tubular housing and engageable with the ends of said clutch jaws when a predetermined axial load differential is applied to said spring seat and actuating member, and a helical spring disposed intermediate said spring seat and actuating member for urging the actuating member to release the jaws from the interior walls of said housing.

8. A self-levelling support comprising: a frame; a pair of substantially parallel tubular housings mounted to said frame; a continuous support extending through both tubular housings and slidable relative to each; and clutch means within each housing responsive to a predetermined load applied to the support within respective housings for clutching said support to said housings; said pair of tubular housings being an integral portion of a continuous U-shaped support member and having a communicating passageway between the interiors of said tubular housings, said continuous support member extending through said communicating passageway and being comprised of rigid bead members.

References Cited by the Examiner

UNITED STATES PATENTS

| | | | |
|---|---|---|---|
| 2,956,368 | 10/60 | Klein | 248—188.3 |
| 2,971,776 | 2/61 | Charley et al. | 280—450 |
| 3,053,559 | 9/62 | Frick | 287—129 |

FOREIGN PATENTS 524,330   12/53   Belgium.

CLAUDE A. LE ROY, *Primary Examiner.*

CARL W. TOMLIN, *Examiner.*